No. 895,447. PATENTED AUG. 11, 1908.
E. W. GANS & J. C. ACKERMAN.
BELT GUIDE.
APPLICATION FILED AUG. 15, 1906.
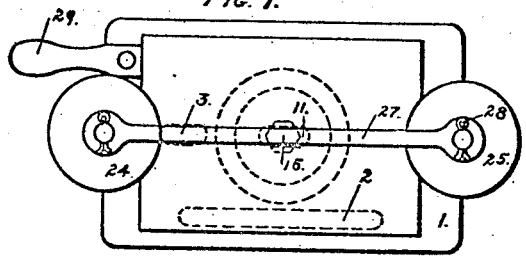
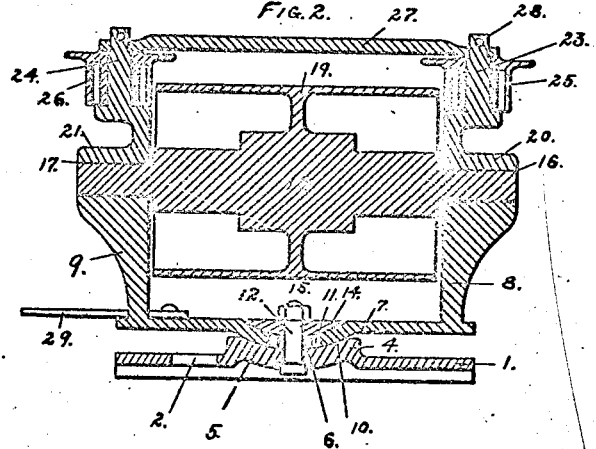
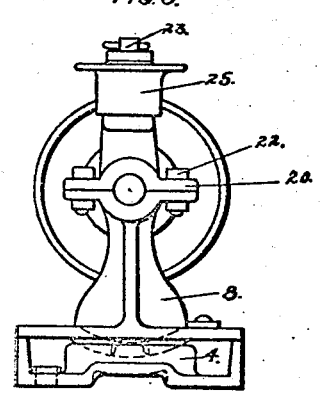
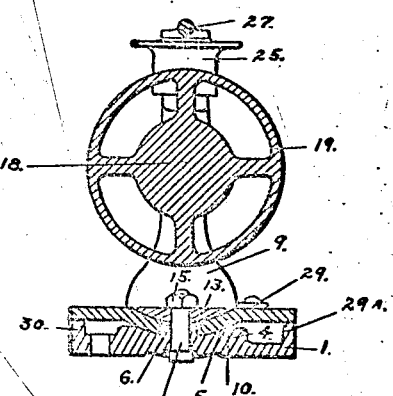
Witnesses
J. A. Frey
R. W. Porch
Inventors
Emmet W. Gans and
John Christian Ackerman
By John H. Goss
their Attorney

UNITED STATES PATENT OFFICE.

EMMET W. GANS AND JOHN CHRISTIAN ACKERMAN, OF MANSFIELD, OHIO, ASSIGNORS TO THE AULTMAN & TAYLOR MACHINERY COMPANY, OF MANSFIELD, OHIO, A CORPORATION OF OHIO.

BELT-GUIDE.

No. 895,447.  Specification of Letters Patent.  Patented Aug. 11, 1908.

Application filed August 15, 1906. Serial No. 330,650.

*To all whom it may concern:*

Be it known that we, EMMET W. GANS and JOHN CHRISTIAN ACKERMAN, citizens of the United States, residing at Mansfield, in the county of Richland and State of Ohio, have invented certain new and useful Improvements in Belt-Guides, of which the following is a specification.

Our invention relates to belt guides and is especially adapted to be used on threshing machines in the field.

Our invention consists in suitable mechanism that has for its objects the construction of a belt guide that will counteract the tendency of the belt from running to either side of the driving or driven pulley.

It is well known that the tendency of the belt is to run to the high side of the pulley under ordinary circumstances. In practice, therefore, it is necessary to have the shafts, upon which the driving or driven pulleys are mounted in true parallelism and on a plane with each other, in order to secure full belt contact. In the operation, however, of threshing machines and other machines of the same character where it is not possible to place the driving pulley and driven pulley exactly parallel, or on a plane with each other or from some other cause such as high winds, the tendency of the belt is to run off or to one side of the driven pulley or driving pulley.

A further object is to construct the belt guide by means of which either side of the guide pulley can be raised, lowered, swung closer, or farther away from the driving or driven pulley, and means to securely retain the belt guide pulley at any such relative position with reference to either the driven or driving pulley. Other objects and advantages will appear in the description and will be specifically pointed out in the claims.

In the accompanying drawing, Figure 1 is a top plan view of our invention. Fig. 2 is a cross-sectional side elevation showing the detailed mechanism of our belt guide and means employed to adjust it to counteract the tendency of the belt to move to either side. Fig. 3 is an end plan view of our invention. Fig. 4 is a cross-sectional end elevation of our invention taken through the center of Fig. 2.

In the construction of our belt guide, we provide a plate (1) having slots (2 & 3) through which bolts or other fastening means are inserted to secure the plate in its proper relative position with reference to the belt it is desired to guide. An annular upwardly extending boss is provided with an annular concave portion (5) which surrounds the washer (6). A swinging frame (7) with upwardly extending members (8 & 9) is provided and adapted to oscillate and swing upon the plate (1) as will be hereinafter described. An annular convexed portion (10) is secured to or made integral with the frame (7) and is adapted to fit the concave portion of the plate (1). It is also provided with an elongated slot (11) to permit the oscillation of the guide pulley.

Suitable apertures are provided in the center of the concave portions of the plate (1) and the convexed portion of the frame (7) into which a collared bolt (12) is inserted. A convexed washer (13) adapted to fit the concave portion (14) of the frame is interposed between said convexed portion and the nut (15) of the bolt for the purpose of rigidly securing the plate and frame. This construction, it will be observed, forms a modified ball and socket joint. The bolt (12) movably secures the plate (1) and the frame together in any relative position desired or necessary to guide the belt. Longitudinal bearings (16 & 17) are provided in the upwardly extending members (8 & 9), forming bearings for the shaft or journal (18) of the guide pulley (19). Bearing caps (20 & 21) are provided and secured to the upwardly extending members (8 & 9) by the bolts (22). Vertical shafts or journals (23 & 24) are made integral or secured to the caps forming bearings for the idler rollers (25 & 26). The shafts (23 & 24) project above the top of the idler rollers (25 & 26). A brace (27) having suitable apertures in each end, is fitted to the projecting portions of the shafts (23 & 24) which braces the caps and prevents any tendency of the caps or vertical shafts to vibrate or move out of true alinement. The brace is held in place by the cotter pins (28).

An operating handle (29) is secured to the frame (7) by any ordinary fastening means, and is used to adjust the guide pulley (19) which is journaled in the swinging frame (7) to counteract the tendency of the belt to run off or to either side of the periphery of the driven or driving pulley. When the nut (15) of the bolt (12) is loosened the frame (7) can be raised or lowered through the medium of the operating handle (29) forcing either one side or the other of the guide pulley (19) higher or lower at the will of the operator.

If it is desired to bring either end of the guide pulley (19) closer or farther away from the driven or driving pulley, the frame (7) is swung in the ball and socket bearing or joint bringing either end closer or farther away from the pulleys at the will of the operator. In swinging the frame (7) through the medium of the operating handle (29) a compound movement of the axis of rotation of the guide pulley is obtained. The frame (7) can be swung so that either end of the guide pulley is brought closer to or farther away from the driven or driving pulley taking up the slack on either side of the belt. If, however, it is desired, either end of the guide pulley (19) can be raised or lowered throwing the axis of the guide pulley out of parallelism with either the driven or driving pulley and controlling and guiding the belt in such a manner as to counteract the tendency of the belt to run to either side of the driven or driving pulley on account of being out of parallelism with the pulleys or on a different plane or other causes. The idler rollers (23 & 24) contact with the edges of the belt and assist the guide pulley in keeping the belt in the center of the driving and driven pulleys.

Reference figures and numerals 29ª and 30 designate supports formed on the lower plate 1 to pivotally support the central portion of the frame 7 to prevent the frame from tilting.

In the operation of the belt guide as described above when it is desired to adjust the guide pulley to its proper relative position to control and guide the belt so that it will run true on the periphery of the driving or driven pulley, the nut of the bolt which secures the frame and plate in any adjusted position is loosened and the operator grasps the handle 29 which imparts movement to the belt guide frame forcing the guide pulley in contact with the belt and in the direction necessary to make it run true on the driven or driving pulley. The nut is then tightened and the frame is held in its adjusted position.

Having fully described our invention, what we claim and desire to secure by Letters Patent is:

1. A belt guide for threshing machines or the like comprising a plate having a concave up-standing central portion, a frame having parallel arms extending therefrom with horizontal bearings formed therein, said frame having vertical journals formed on the upper extremities, a guide pulley journaled in the horizontal bearings below the vertical journals, guard pulleys mounted on said vertical journals, said frame having a convex central portion adapted to fit the concave portion of the plate, and means to adjustably secure said frame to the plate whereby said frame can be retained in or out of alinement with the driving or driven pulley.

2. In a belt guide for threshing machines or the like, the combination of a stationary plate having a concave central portion extending above the upper surface with an aperture provided therein, a bolt fitted to said aperture, a bifurcated frame having a convex central portion adapted to fit the concave central portion of the stationary plate forming a bearing to provide for angular adjustment of said frame, and a guide pulley journaled in said frame substantially as and for the purpose described.

3. In a belt guide for threshing machines or the like, the combination of a stationary plate having a concave central portion extending above the upper surface with an aperture provided therein, a bifurcated frame having a convex central portion adapted to fit the concave central portion of the stationary plate forming a bearing to provide angular movement for said frame, a bolt to movably secure said frame and plate together, a guide pulley journaled in said frame, said frame having vertical journals formed thereon, and guard pulleys mounted on said vertical journals and adapted to rotate thereon as and for the purpose described.

4. In a belt guide, the combination of a stationary plate having a central portion formed concave and an aperture provided in the center thereof, a frame provided with two up-standing arms with the upper or free ends thereof provided with vertical journals, a convex projecting portion being formed on the bottom of said frame and adapted to engage with the concave portion of said plate, means to movably secure said plate and frame together, a guide pulley journaled in said frame, guard pulleys journaled on the upper ends of said frame, a brace secured to the upper ends of the arms of the frame, and means provided on the frame to force the guide pulley in contact with the belt it is desired to guide and counteract the tendency of the belt to run out of true alinement with a driven or driving pulley, as and for the purpose described.

In testimony whereof we, affix our signatures in presence of two witnesses.

EMMET W. GANS.
JOHN CHRISTIAN ACKERMAN.

Witnesses:
CLAUDE H. LACEY,
MAY THOMAS.